UNITED STATES PATENT OFFICE.

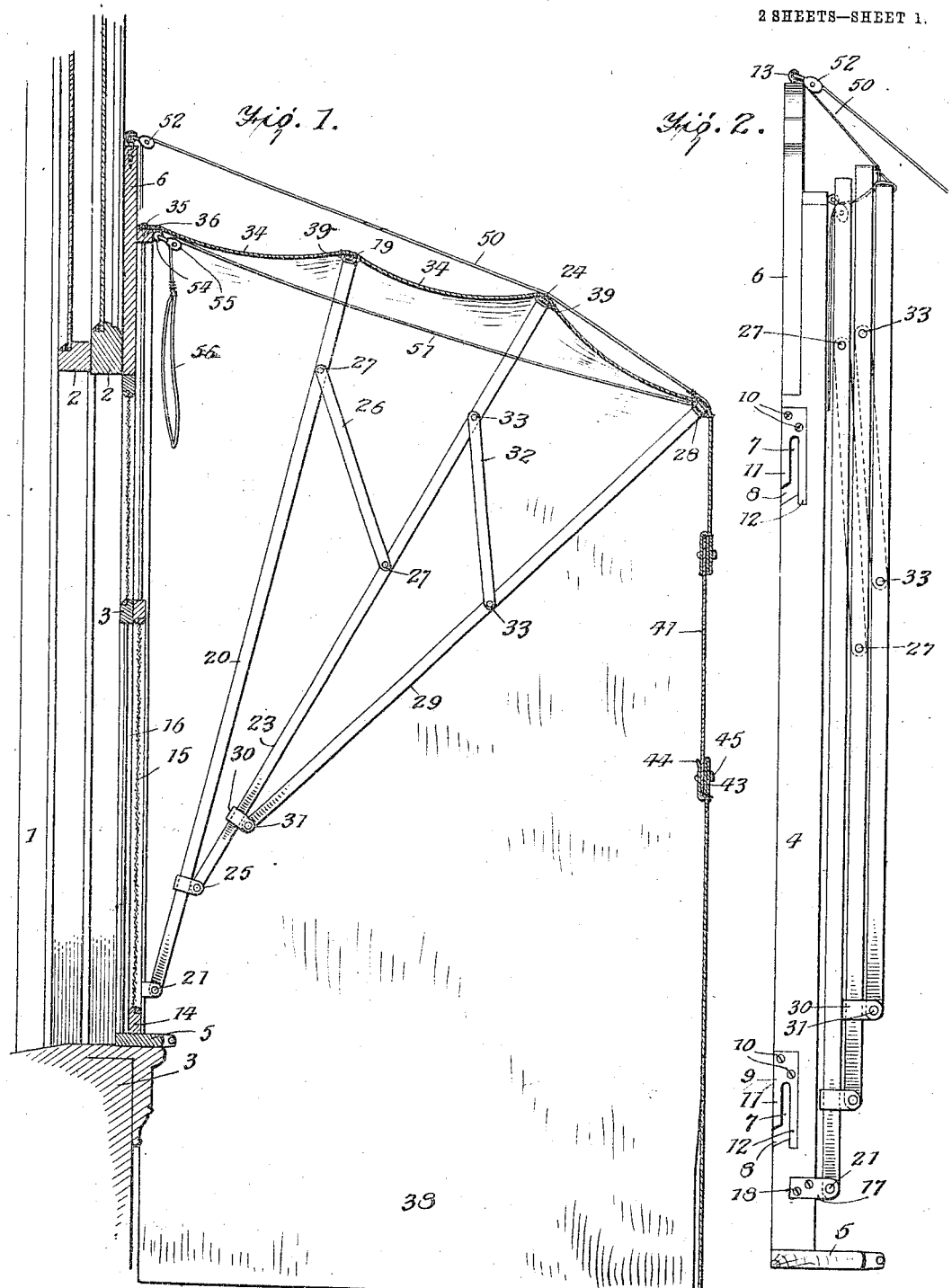

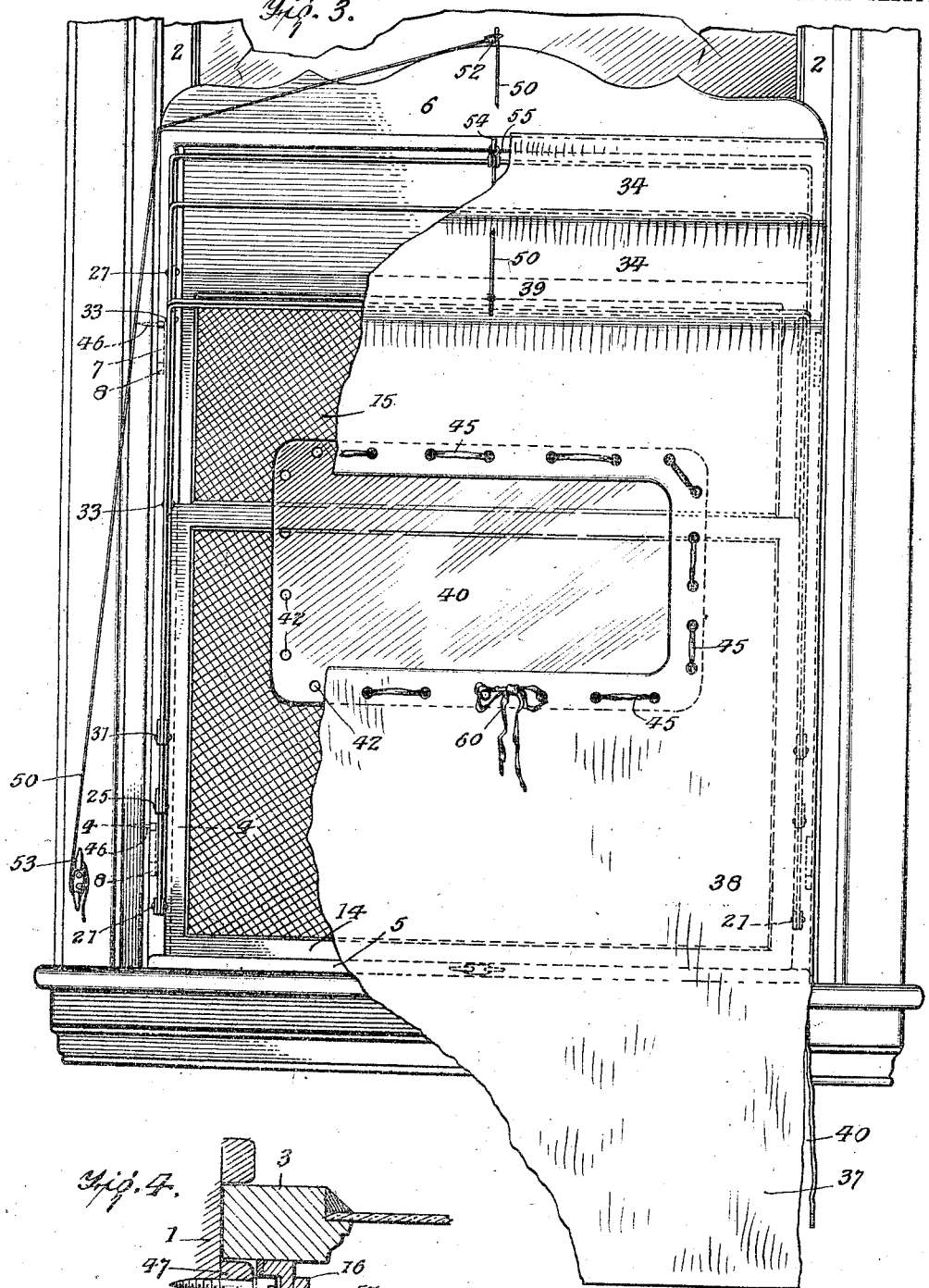

GEORGE R. SMITH, OF ARLINGTON, MARYLAND.

WINDOW-TENT.

964,455.

Specification of Letters Patent. Patented July 12, 1910.

Application filed March 14, 1910. Serial No. 549,221.

*To all whom it may concern:*

Be it known that I, GEORGE R. SMITH, a citizen of the United States, and a resident of Arlington, in the county of Baltimore and State of Maryland, have made certain new and useful Improvements in Window-Tents, of which the following is a specification.

My invention is an improvement in window tents, and consists in certain novel constructions, and combinations of parts, hereinafter described and claimed.

The object of the invention is to provide a simple and inexpensive device of the character specified, especially adapted to protect a sleeper from dust, insects, and like external annoyances, while at the same time permitting the said sleeper to have all the advantages of sleeping in the open air.

A further object is to provide a device which may be easily removed and replaced, folded or unfolded, and which will be light, compact, and which may be attached with a minimum amount of injury to the window.

Referring to the drawings forming a part hereof, Figure 1 is a vertical section of the improvement in place, and in open position, Fig. 2 is a side view of the frame of the improvement in folded position, Fig. 3 is a front view, with parts of the covering broken away, and Fig. 4 is a section on the line 4—4 of Fig. 3.

The present embodiment of the invention is shown applied to the stiles 1 of a window casement, having the usual sashes 2, and sill 3, and consists of a substantially rectangular frame, composed of side bars or members 4, a base 5, and a top bar or plate 6.

Each of the side bars 4 is provided near its upper and lower ends, with longitudinal slots 7, which are provided at their lower ends with lateral inclined extensions 8, leading to the edge of the side bar, which is adjacent to the casement. A reinforcing plate 9 is secured to the bar by screws 10, adjacent to each slot, and is provided with a pair of arms 11 and 12, one extending on each side of the slot, the end of the arm 11 being beveled to fit the side of the lateral extension, while the arm 12 extends below the said extension. At its upper end, and at the edge adjacent to the casement, the bar is cut away to receive the top plate 6, and the said plate extends above the side bars as shown, and is provided at its center, with a screw eye 13, for a purpose to be presently described. The base 5 is arranged with its widest dimension horizontal, and is secured to the ends of the side bars in this manner. On its inner face each side bar 4 is provided with a plurality of parallel longitudinally arranged ribs 16, which are received in grooves in the frames 14 of screens, the frames being covered with the usual gauze covering 15, one screen is arranged at the top of the frame, and the other near the bottom, and each frame engages one pair of ribs.

A pair of brackets 17 extends laterally from each side bar near its lower end, and from the edge remote from the casement, being secured in place by screws 18. A substantially U-shaped frame or bar consisting of a body portion 19, and arms 20, is pivoted to the brackets 17, by means of rivets 21 one of which is passed through registering openings in the end of each arm, and on the adjacent pair of brackets.

A U-shaped hanger 22 is slidable on each of the arms 20 of the frame, near its lower end, and the adjacent end of the arm 23 of a second U-shaped frame 24 is received between the ends of the hanger, and is pivoted thereto by a rivet 25. A link 26 connects the adjacent arms of the two frames, near their junction with the body portion, each end of the link being pivoted to the adjacent arm by a rivet 27. A third U-shaped frame 28 is connected with the second frame in the same manner, the ends of the arms 29 of the frame being received between the ends of hangers 30, slidable on the arms 23 of the second frame near their lower ends, and pivoted thereto by rivets 31, and a similar link 32, is connected to the second and third frames by rivets 33. It will be observed that the links 26 and 32 are inclined with respect to the arms, to permit the frames to be folded against each other as shown in Fig. 2.

A covering 34 of fabric material is supported on the frames, the upper edge of the cover being secured by tacks 35 to the upper face of a cross bar 36, which is arranged transversely of the frame and connects the upper end of the side bars 4 in front of the plate 6. The covering depends in front as at 37, and on each side as at 38, below the base 5 of the frame, and is stitched to the body portions of the U-shaped frames as shown at 39 in Fig. 1.

It will be noticed that the front 37 of the covering depends below the sides 38, and below the sill 3 of the casement, and the sides are separated from the front as shown at 40. Near its connection with the third frame 28, the front 37 of the covering is provided with a rectangular opening, in which is supported a sheet 41 of transparent material such as celluloid or mica the edges of the sheet being provided with spaced openings 42. Around the opening, the edges of the covering are turned downwardly as at 43, and thence upwardly as at 44, to form a groove for receiving the edges of the sheet, and the side walls of the grooves are provided with openings registering with the openings 42. A lace 45 is passed through the registering openings, to hold the sheet in place.

The improvement is held in place by means of screws 46, which are passed through cushions or buffers 47, and threaded into the inner faces of the stiles 1 of the casement. The heads 48 of the screws are engaged with the slots 7 of the side bars, being entered through the extensions 8, and the screen frames prevent inward movement of the side bars, so that the heads of the screws cannot become disengaged from the slots.

The improvement normally stands in the position shown in Fig. 1, and is held in this position by the covering. When it is desired to fold the frame, a pair of ropes are made use of, one 50 being arranged above the covering, and the other 51 below the same. The rope 50 is connected to the center of the body portion of the third U-shaped frame, and passes inwardly over a pulley 52, suspended from the screw eye 13, to a cleat 53 secured to the outer face of one of the stiles of the casement. The inner rope 51 is also secured to the body portion of the third frame, at approximately its center, and passes inwardly over a pulley 54, suspended from a screw eye 55 in the strip 36, the free end being provided with a loop 56 for convenience in pulling the said rope. The groove 57 of each of the side members of the screen frames, is lined with a lining 58, to reduce friction, and the ends of the lace are knotted together as shown at 60.

The operation of the improvement will be obvious from the description, and it will be evident that the frame may be readily removed and replaced, folded or unfolded, and the view from the window will not be cut off when the improvement is in place. The device as a whole is simple, and not expensive. It will be noticed that the highest part of the frame is only a short distance above the top of the lower sash, while the lower edge of the plate 6 is flush with the lower edge of the said sash when in uppermost position. The device is therefore light, and easily handled, and when detached and folded forms a compact bundle, capable of storage in a restricted space. When used in connection with a bed, either the side or the head of the bed may be abutted against the wall in which the window is placed, and the front 37 and sides 38 of the covering are of a length to rest upon the coverings of the bed, the occupant of the bed having only his or her head beneath the tent.

Annoying insects are excluded by the screens, as is also dust and the like, so that while practically out of doors, the occupant is perfectly protected from such annoyances, and from the direct effect of the weather. With a light in the room, the tent is also sufficiently illuminated for practical purposes.

Since but four screws are made use of for supporting the device, and the said screws are on the inner face of the stiles of the casement, no injury is done to the window, and the screws are practically unnoticeable. The cushion or buffer 47 prevents any marring of the casement, when attaching or detaching the frame. The slots for receiving the screws are bayonet slots, and the head of the screw practically occupies the full width of the slot, so that there will be no rattling of the frame when in place.

I claim—

1. In a device of the character specified, the combination with the window casing, of a frame consisting of side bars, a base bar, and a top bar, the side bars each having near its ends a longitudinal slot provided at its lower end with a lateral extension leading to one edge of the bar, screws on the inner faces of the casement stiles having heads for engaging the slots, buffers on the screws adjacent to the stiles, each of said side bars having on its inner face a pair of parallel longitudinal ribs, an upper and a lower screen frame having grooves in its side edges for receiving the corresponding members of each pair of ribs, a bracket on each side bar near its lower end and extending in the opposite direction from the casement, a substantially U-shaped frame having the lower ends of its arms pivoted to the bracket, a second U-shaped frame having the ends of its arms pivoted to the corresponding arms of the first frame near their lower ends, a third U-shaped frame having the ends of the arms pivoted to the corresponding arms of the second frame, a cover secured to the top bar of the frame and to the U-shaped frames, and depending in front and at its sides below the sill of the casement, said cover having an opening in front of the window, a sheet of transparent material filling the opening, a pulley on the top bar above and below the attachment of the covering, and a plurality of ropes secured to the third U-shaped frame and passing over the respective pulleys.

2. In a device of the character specified, a substantially rectangular frame, means for detachably connecting said frame with a window casement, a bow pivoted to the frame, a second bow having its arms pivoted to the first bow, a third bow having its arms pivoted to the second bow, a covering connected to the top and sides of the frame and to the bows, the said covering extending below the frame at its front and sides, and having an opening near the top of the front thereof, a sheet of transparent material within opening, and a link connecting each of the arms of the bows to the adjacent arms of the other bows.

3. A device of the character specified, comprising a frame, means whereby said frame may be detachably connected with a window casement, a folding frame pivoted to the first-named frame, a covering connected to the top and sides of the first-named frame and extending over the folding frame, the said covering extending below the frame at its front and side, and having an opening near the top thereof, a sheet of transparent material within the opening, means for folding the folding frame upon the first-named frame, said folding frame consisting of a plurality of bows, one of which is pivoted to the first-named frame, and a link connecting each bow with the succeeding bow.

GEORGE R. SMITH.

Witnesses:
H. CRAWFORD EMICH,
H. HOLLIDAY EMICH.